United States Patent [19]

Christen et al.

[11] Patent Number: 4,619,753

[45] Date of Patent: Oct. 28, 1986

[54] BIPOLAR PLATE FOR AN APPARATUS WITH A STACKED CONFIGURATION, SAID APPARATUS COMPRISED OF A PLURALITY OF ELECTROCHEMICAL CELLS WITH SOLID ELECTROLYTE; AND METHOD OF MANUFACTURING SAID PLATE

[75] Inventors: Hans-Jörg Christen, Untersiggenthal; Hubert Devantay, Neuenhof; Claude Schellenberg, Birmenstorf; Günther Scherer, Gebenstrof; Samuel Stucki, Nussbaumen, all of Switzerland

[73] Assignee: BBC Brown, Boveri & Company Limited, Baden, Switzerland

[21] Appl. No.: 692,522

[22] Filed: Jan. 18, 1985

[30] Foreign Application Priority Data

Jan. 26, 1984 [CH] Switzerland ............................ 354/84

[51] Int. Cl.⁴ ........................ B65D 85/18; H01M 4/88
[52] U.S. Cl. ................................. 204/290 F; 429/44
[58] Field of Search ...................... 429/44, 45, 210, 36, 429/37, 38; 204/290 F, 279

[56] References Cited

U.S. PATENT DOCUMENTS

| | | | |
|---|---|---|---|
| 3,188,242 | 6/1965 | Kordesch et al. | 429/36 |
| 4,214,969 | 7/1980 | Lawrance | 429/38 |
| 4,326,943 | 4/1982 | Banziger et al. | 204/290 F |
| 4,522,895 | 6/1985 | Shigeta et al. | 429/44 |

*Primary Examiner*—Donald L. Walton
*Attorney, Agent, or Firm*—Oblon, Fisher, Spivak, McClelland & Maier

[57] ABSTRACT

A bipolar plate for an apparatus having a stacked configuration, said apparatus comprised of a plurality of electrochemical cells and employing a solid electrolyte, said bipolar plate comprised of a porous titanium plate (1) having a parallel groove structure (3), said bipolar plate further comprised of a non-porous, solid titanium plate (2) strongly welded to plate (1) at contact loci (4), wherewith channels (5) are present, and said bipolar plate further comprised of a surface layer or coating (6) comprised of a material which is a catalyst for electrolytic reactions. A method of manufacturing the subject bipolar plate, comprising the following: Powder metallurgical manufacture of the porous titanium plate (1), and bonding of plate (1) to the solid titanium plate (2) by sintering. Further development of the bipolar plate by applying a non-porous, solid graphite and PVF composite plate (7) with a parallel groove structure (8), and further applying a porous graphite and PVF composite plate (10), wherewith channels (9) are present. Combining of the plates by hot pressing, sintering, or adhesive bonding, to form a compact, mechanically strong electrically conducting whole.

4 Claims, 6 Drawing Figures

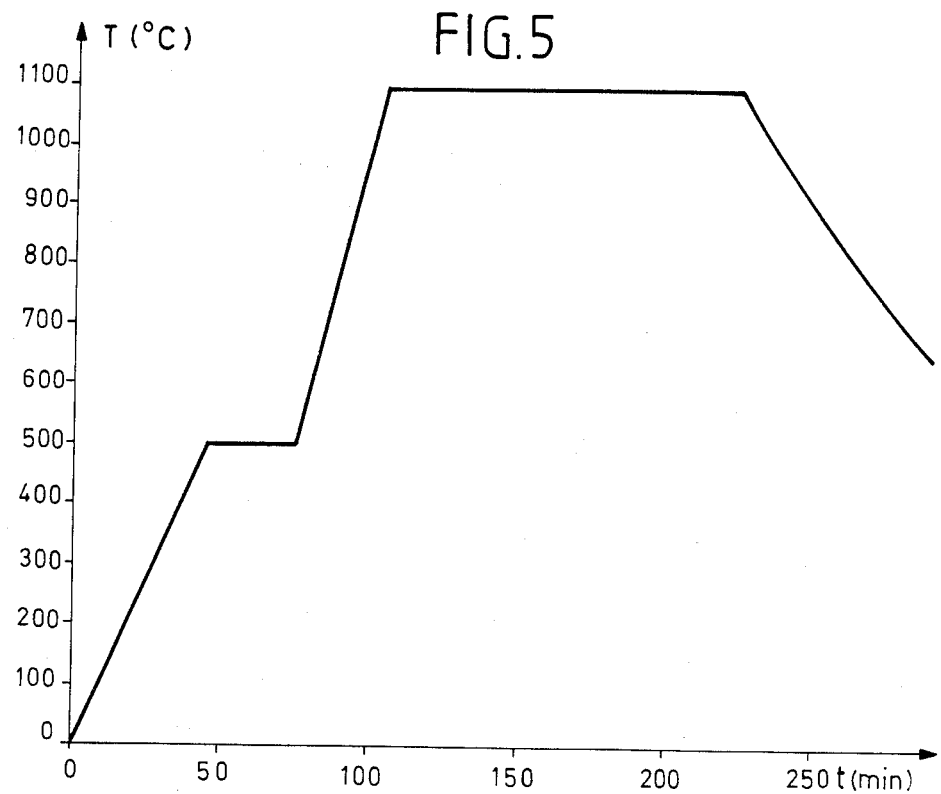
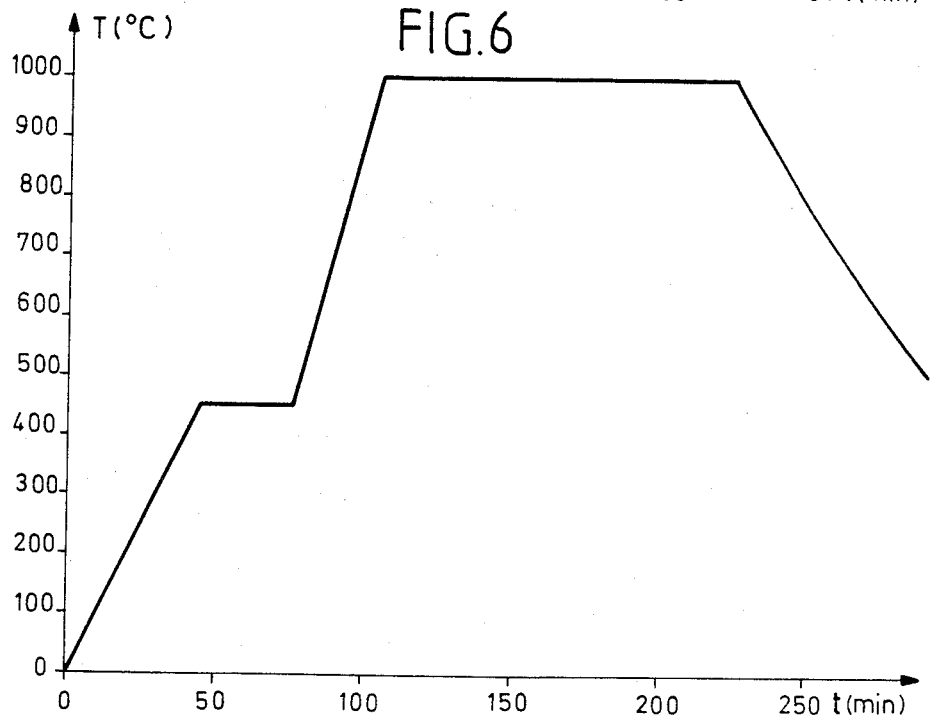

BIPOLAR PLATE FOR AN APPARATUS WITH A STACKED CONFIGURATION, SAID APPARATUS COMPRISED OF A PLURALITY OF ELECTROCHEMICAL CELLS WITH SOLID ELECTROLYTE; AND METHOD OF MANUFACTURING SAID PLATE

FIELD OF THE INVENTION

This invention relates to bipolar plates for apparatus with a stacked configuration, and to a method for manufacturing the same.

DESCRIPTION OF THE PRIOR ART

A bipolar plate for an apparatus having a stacked configuration similar to that of a filter press, said apparatus comprised of a plurality of electrochemical cells, must satisfy a number of conditions. On the one hand it must have good electrical conductivity, and on the other it must be as corrosion resistant as possible under the conditions of operation. Materials employed for the anodes of such plates include metallic materials such as corrosion resistant steels, passivatable elements (Ti, Ar, Hf, Nb, Ta, etc.—so-called "valve metals" since these are often used in valves), and also graphite, graphite composite materials, and various combinations of materials. A composite material is known for this purpose which is comprised of graphite and polyvinyl fluoride ("PVF") (U.S. Pat. No. 4,214,969). For highly corrosive media, particularly in the presence of ozone, support materials comprised of titanium in the form of solid plates or porous foils are often employed.

Experience shows that graphite-containing (carbon-containing) materials are not corrosion-resistant, at least on the anode side, and their service life leaves something to be desired. On the other hand, when solid titanium is used as a support for the electrode structure, there are substantial costs associated with the mechanical forming of the parallel groove structure which structure is absolutely required for solid electrolyte cells. In addition, the anode side layer comprised of porous titanium must be provided with a suitable noble metal depassivation coating in order to ensure a good pressure contact for current conduction. This constitutes another reason for the relatively high cost of titanium-based anodes.

Accordingly, there is a need for a new, economical bipolar plate, and a low cost method of manufacturing the same.

SUMMARY OF THE INVENTION

The object of the invention is to devise a bipolar plate for an electrochemical cell, and a method of manufacturing said plate, wherewith the plate has good electrical conductivity and current distribution along with high corrosion resistance and good mechanical and chemical thermodynamic long-term stability, and is inexpensive with respect to both technical and economic resources. In addition, the bipolar plate should be capable of being produced in a form which is relatively thin yet gas-impermeable.

This object is achieved with the present bipolar plate for an apparatus having a stacked configuration comprised of a plurality of eletrochemical cells and employing a solid electrolyte, where at least one support comprised of porous titanium and serving as a current collector is provided. The bipolar plate is characterized in that the support is comprised of a porous titanium plate having a parallel groove structure which is welded on its face side to a non-porous, solid titanium plate at the plane loci of contact, thereby forming laterally closed, continuous channels. The bipolar plate is further characterized in that the side of the porous titaium plate which is directed away from the parallel groove structure is provided with a surface layer or coating comprised of a material which is a catalyst for eletrolytic reactions.

The bipolar plate for an apparatus having a stacked configuration comprised of a plurality of electrochemical cells and employing a solid electrolyte is manufacture in accordance with the following method. A support serving as a current collector is produced by sintering titanium powder which is characterized in that the titanium powder is applied to a graphite substrate having a complementary negative form of a parallel groove structure, distributed mechanically, and vacuum sintered to form a porous titanium plate. The titanium plate is removed from the substrate and the side of the plate bearing the parallel groove structure is placed on a non-porous, solid titanium plate which has been covered with a thin layer of titanium powder. The plates are vacuum sintered to form a unitary, rigidly and strongly welded whole which comprises closed, continuous channels.

BRIEF DESCRIPTION OF THE DRAWINGS

The invention will be described hereinafter with the aid of exemplary embodiments which are further elucidated and illustrated in the drawings.

FIG. 5 is a plot of temperature vs. time for the heat treatment associated with the manufacture of the porous titanium plate with parallel groove structure; and FIG. 6 is a plot of temperature vs. time for the heat treatment associated with the binding of the above-mentioned porous titanium plate to the solid titanium plate.

DETAILED DESCRIPTION OF THE PREFERRED EMBODIMENTS

Figure 1:
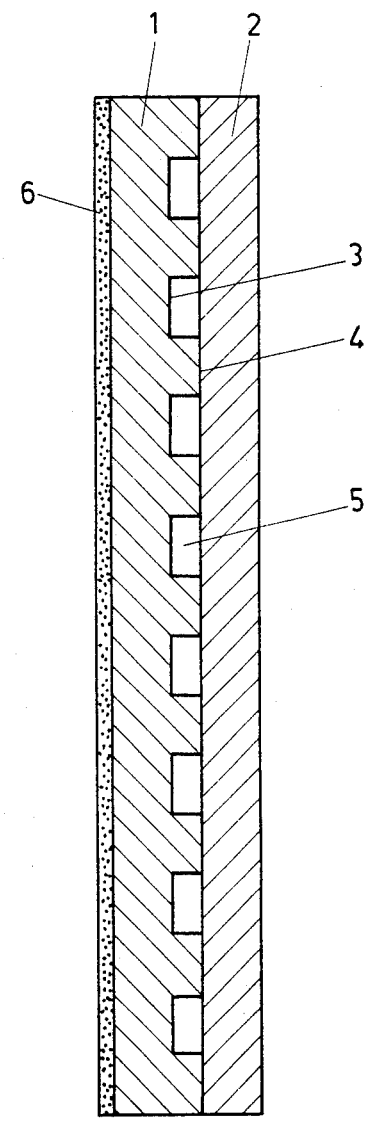
FIG. 1 is a cross section through an embodiment of a bipolar plate according to the invention.

In FIG. 1, which is a cross section through a first embodiment of a bipolar plate, a porous titanium plate 1 has a parallel groove structure 3 on the side facing the solid electrolyte. Adjoining plate 1 is a solid, non-porous titanium plate 2. The two titanium plates 1 and 2 are bound together mechanically rigidly and electrically conductively, at the contact points 4 which are formed by the webs between the grooves of the parallel groove structure 3. These contact points 4, which are basically equivalent to weld connections, are produced by a sintering process. The rigid binding together of the titanium plates 1 and 2, incorporating the parallel groove structure 3, results in a system of channels 5. The surface bears a surface layer 6 comprised of a material which is a catalyst for electrolytic reactions of interest.

Figure 2:
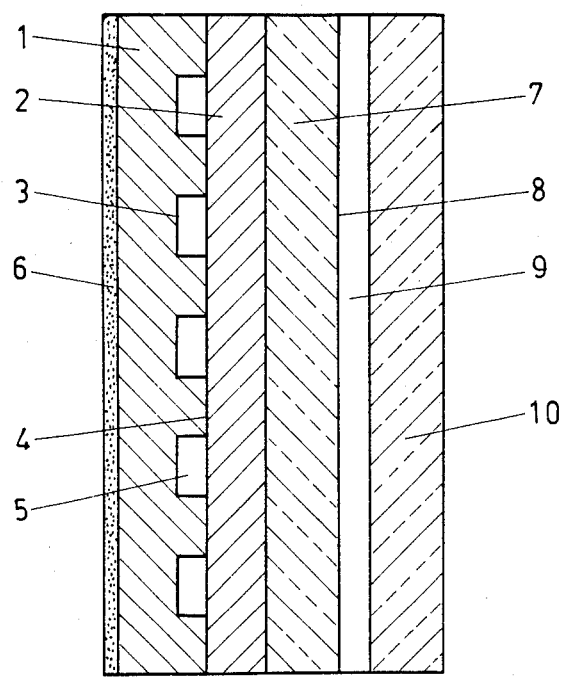
FIG. 2 is a vertical cross section through a second bipolar plate according to the invention.
Figure 3:
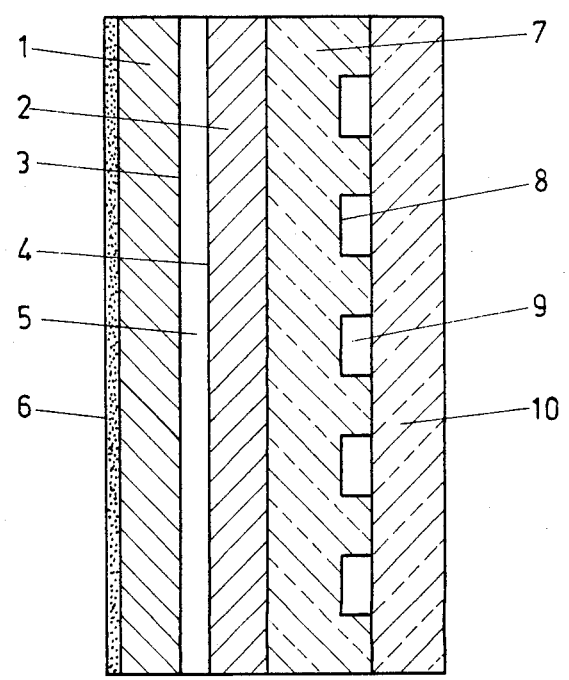
FIG. 3 is a horizontal cross section through the bipolar plate of FIG. 2.

FIGS. 2 and 3 are a vertical and a horizontal cross section, respectively, through a second embodiment of a bipolar plate. The reference numerals 1 to 6 correspond to FIG. 1. Also present is a solid (non-porous) composite plate 7 comprised of a mixture of graphite and PVF, which plate has a parallel groove structure 8 on one side; 10 is a porous composite plate comprised of graphite and PVF. The two composite plates 7 and 10 are bound together mechanically strongly and electrically conductively at the face of the parallel groove structure 8, thereby forming a system of channels 9. The non-porous, solid titanium plate 2 and the non-porous, solid graphite and PVF composite plate 7 are mechanically strongly and electrically conductively bonded together, to form a compact whole. The parallel groove structures 3 and 8 (correspondent to the channels 5 and 9, respectively) which are shown in FIGS. 2 and 3 are disposed at a mutual 90° angle. This affords advantages with respect to passage of liquids and gases when the entire stack is assembled which stack comprises a large number of cells. It is obvious that the parallel groove structures may be given a different mutual orientation, e.g. parallel, or disposed at a mutual angle other than 90°.

Figure 4:
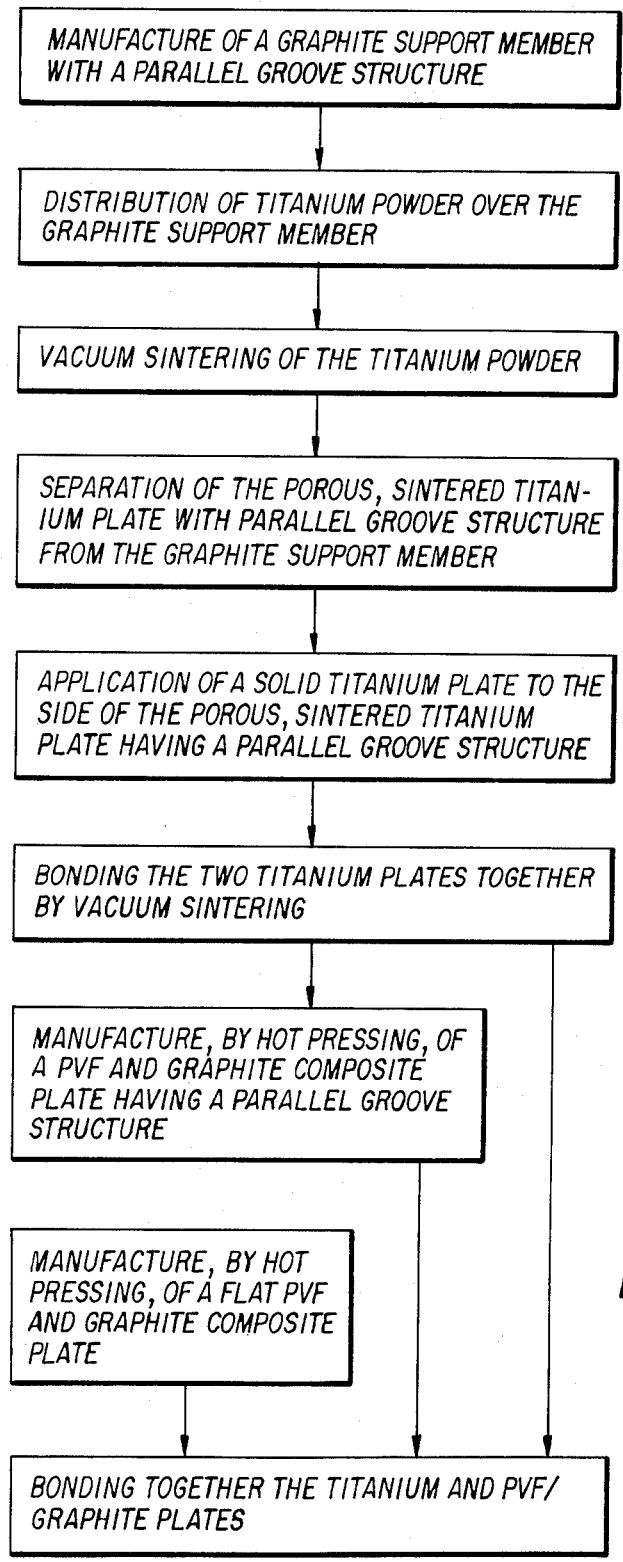
FIG. 4 is a flow diagram (block diagram) of the manufacturing process for a bipolar plate according to FIGS. 2 and 3.

FIG. 4 is a block diagram showing the steps in the manufacture of a bipolar plate according to the embodiment of FIGS. 2 and 3. The Figure is self-explanatory.

FIG. 5 shows a plot of temperature vs. time for the heat treatment in the powder metallurgy manufacture of the porous titanium plate 1 with parallel groove structure 3. The separate phases comprising heating, drying, snd sintering of the titanium powder are clearly visible.

FIG. 6 shows a plot of temperature vs. time for the heat treatment in the bonding together of the porous titanium plate 1 and the non-porous, solid titanium plate 2. The Figure is self-explanatory.

Exemplary Embodiment I (See FIGS. 1, 5, and 6):

First, a porous titanium plate 1 with parallel groove structure 3 was manufactured. For this purpose, a generally platelike support comprised of graphite material (e.g., "Ringsdorff EK 72") was fabricated which was configured with the negative complement of the parallel groove structure 3 on its (the graphite support's) upwardly directed surface. The legs in the graphite support which corresponded to the grooves in the titanium plate 1 were provided with a slight taper (amounting to a 15° trapezoidal profile on the sides (not indicated in FIG. 1) in order to allow for contraction in the subsequent sintering process, to avoid adhesion, and to enable easy removal of the finished titanium plate 1. The graphite support had an edge member which extended upward, in order to accommodate the titanium powder. The graphite support was placed on a horizontal supporting surface with its (the graphite support's) negative parallel groove structure directed upward, and was dusted with graphite power ("Lonza KS 75") in order to avoid subsequent adhesion of the titanium powder. Then the titanium powder, with particle size 15 to 90 micron ("SS150" supplied by Sumitomo of Osaka) was charged mechanically to the graphite support to a height of 4 mm (including the parallel groove structure) and was evenly distributed thereon. The entire mass was then charged into a vacuum furnace with a residual gas pressure of $10^{-5}$ Torr and was subjected to the following heat treatment see FIG. 5):

Heating from room temperature to 500° C. over 45 min;
Holding at 500° C. for 30 min;
Heating from 500° C. to 1100° C. over 30 min;
Holding at 1100° C. for 2 hr (sintering); and
Cooling in the furnace to c. room temperature.

After the cooling, the sintered porous titanium plate 1 was removed from the graphite support and placed on a nonporous, solid titanium sheet 2 having thickness 1 mm, which sheet 2 had previously been sprinkled with titanium powder. In this, the side of plate 1 whch faced downward was the parallel groove structure side 3. The function of sheet 2 in the finished assembly was that of anode current collector. The entire mass was then placed on a flat horizontal graphite support in a vacuum furnace with a residual gas pressur of $10^{-5}$ Torr and was subjected to the following heat treatment (see FIG. 6):

Heating from room temperature to 500° C. over 45 min;
Holding at 500° C. for 30 min;
Heating from 500° C. to 1000° C. over 30 min;
Holding at 1000° C. for 2 hr (bonding by sintering); and
Cooling in the furnace to ca. room temperature.

The points of contact 4 between the porous titanium plate with parallel groove structure 3 and the non-porous, solid titanium sheet 2 proved to be strong, rigid metallurgical bonds. In the process the titanium plates remained flat, and after cooling they showed no warping or waving. The porous titanium plate 1 was then provided with a surface layer of a material which is a catalyst for electrolytic reactions (in the present case, lead dioxide). The finished, coated bipolar plate had a thickness of ca. 4.5 mm.

Exemplary Embodiment II (See FIGS. 2 and 3):

First, a compound (laminated) titanium plate (2, 1, 6) according to FIG. 1 was manufactured, as per Exemplary Embodiment I.

Then a non-porous, solid composite sheet 7 having parallel groove structure 8 was manufactured by hot pressing a mixture of graphite and PVF; and a porous composite sheet 10 having a flat shape was also manufactured from a mixture of the same composition, by hot pressing.

The following components were used for the starting powder material:
Graphite ("Lonza KS 75") 80 wt. %
Polyvinyl fluoride ("Solvay Solef 5008") 20 wt. %.
The sheets 7 and 10 were formed by mixing, charting into the appropriate molds, and hot pressing the powder at 220° C. for 15 min under a pressure of 10 MPa.

Finally, all the sheets and plates were combined to form the final bipolar plate, by hot pressing with the use of an electrically conducting adhesive. The finished bipolar plate had a thickness of about 8.5 mm.

The scope of the invention is not limited to the exemplary embodiments presented. In particular, the surface layers 6 may be comprised of iridium dioxide and/or ruthenium dioxide or platinum, e.g. if the electrochemical cell is to be used for hydrogen generation by decomposition of water. In the case of electrochemical production of ozone, the surface layer 6 advantageously is comprised of lead dioxide.

The interface transitions between the porous and non-porous plates or sheets may be continuous instead of discrete; this is particularly applicable to the composite sheets 7 and 10.

The proces steps in the manufacture of the bipolar plate accordinq to FIGS. 2 and 3 may be carried out in a different sequence, whereby first the sheet 7 is pressed onto the sheet 2, and these are sintered together or are bonded with conducting adhesive, whereupon the side of sheet 7 having the parallel groove structure 8 is covered by the sheet 10 and is mechanically strongly and electrically conductively bonded to sheet 10 by pressing, sintering, or adhesive bonding. The heat treatments according to FIGS. 5 and 6 may vary as to the time and/or the temperature dimensions and details; the values given here are typical values. This applies particularly to the sintering temperatures, for which a range of up to 100° C. around the base value may be assumed.

The advantages of the inventive plate, particularly the plate according to FIGS. 2 and 3, have been found to be the following:

The mechanical strength is determined essentially by the nonporous, solid titanium sheet 2, wherewith the entire bipolar plate can be made relatively thin but nonetheless gas-impermeable.

The current distribution can be made uniform.

On the anode side (titanium side) there is no hazard of corrosion from oxygen or ozone, because there is no graphite on the anode side.

The cathode part (graphite side) can be kept thin, because it is not subjected to mechanical stress.

Reference Numerals

1 Porous titanium plate with parallel groove structure.

2 Nonporous, solid titanium plate.

3 Parallel groove structure of the porous titanium plate.

4 Locus of contact between the porous and nonporous titanium plates.

5 Channel between the titanium plates.

6 Surface layer or coating comprised of a material which is a catalyst for electrolytic reactions.

7 Non-porous, solid plate comprised of a composite graphite and PVF material.

8 Parallel groove structure of the solid plate comprised of a composite material.

9 Channel between the two plates which plates are comprised of a composite material.

10 Porous plate comprised of a composite graphite and PVF material.

What is claimed as new and desired to be secured by Letters Patent of the United States is:

1. A bipolar plate for an apparatus having a stacked configuration comprised of a plurality of eletrochemical cells and employing a solid electrolyte, wherein at least one support comprised of porous titanium is provided which support serves as a current collector; characterized in that the support is comprised of a porous titanium plate having a parallel groove structure, which structure is welded on its face side to a non-porous, solid titanium plate at the plane loci of contact, whereby laterally closed, continuous channels are formed; and in that the side of the porous titanium plate which is directed away from the parallel groove structure is provided with a surface layer or coating comprised of a material which is a catalyst for electrolytic reactions.

2. A bipolar plate according to claim 1; characterized in that the surface layer or coating is comprised of iridium dioxide, ruthenium dioxide, a platinum material or a mixture thereof.

3. A bipolar plate according to claim 1; characterized in that the surface layer is comprised of lead dioxide material.

4. A bipolar plate according to claim 1; characterized in that a solid, non-porous plate comprised of a composite graphite and PVF material, which plate has a parallel groove structure and forms channels, is strongly and rigidly affixed to the side of the non-porous, solid titanium plate, wherein said composite plate in turn bears a porous plate comprised of a composite graphite and PVF material, which plate is permanently and rigidly affixed to the side of plate on which the parallel groove structure of the latter is disposed, and which plate serves as a current collector.

* * * * *